United States Patent
Williams

[11] Patent Number: 5,914,956
[45] Date of Patent: Jun. 22, 1999

[54] CACHE FOR IMPROVING THE CONNECTION CAPACITY OF A COMMUNICATIONS SWITCH

[76] Inventor: Joel R. Williams, 1240 McKendrie St., San Jose, Calif. 95126-1408

[21] Appl. No.: 08/790,225

[22] Filed: Feb. 3, 1997

[51] Int. Cl.⁶ ............................................ H04L 12/56
[52] U.S. Cl. ................................... 370/395; 370/415
[58] Field of Search ............................ 370/229, 231, 370/235, 250, 252, 259, 260, 381, 382, 283, 395, 412, 413, 415, 428, 429; 711/118, 154, 156, 158, 159, 160; 395/835, 838, 839, 872, 873, 876

[56] References Cited

U.S. PATENT DOCUMENTS

| | | | |
|---|---|---|---|
| 5,067,123 | 11/1991 | Hyodo et al. | 370/396 |
| 5,301,192 | 4/1994 | Henrion | 370/412 |
| 5,479,401 | 12/1995 | Bitz et al. | 370/397 |
| 5,521,923 | 5/1996 | Willmann et al. | 370/412 |
| 5,535,197 | 7/1996 | Cotton | 370/429 |
| 5,535,366 | 7/1996 | Pfieffer et al. | 711/159 |
| 5,555,399 | 9/1996 | Waldron et al. | 711/158 |
| 5,579,480 | 11/1996 | Cidon et al. | 370/412 |
| 5,757,771 | 5/1998 | Li et al. | 370/235 |

*Primary Examiner*—Chi H. Pham
*Assistant Examiner*—Ricky Q. Ngo
*Attorney, Agent, or Firm*—David R. Gildea

[57] ABSTRACT

A cache apparatus and method for improving the connection capacity of an Asynchronous Transfer Mode (ATM) switch. The cache updates the ATM switch with information for configuring connections while maintaining a separate connection table. Incoming data cells are examined by a cell router and routed either directly to the switch, if a connection is already configured, or to a cell holding area while the connection is being set up in the switch. Unused or underused connections are detected in the connection table by a reclaim ager and marked underused. An updater then reviews the connection table to use the connection resources represented by the underused connections for configuring connections for the data cell stored in the cell holding area.

16 Claims, 5 Drawing Sheets

CACHE FOR IMPROVING THE CONNECTION CAPACITY OF A COMMUNICATIONS SWITCH

BACKGROUND OF THE INVENTION

1. Field of the Invention

This invention deals with the arrangements and methods for controlling electronic communications switching equipment such as Asynchronous Mode Transfer (ATM) or frame relay switches.

2. Description of the Prior Art

ATM switching is used in communications systems for switching voice, data, and video information. Frequently these services are supported simultaneously by the same switch. This technology is applied in areas including local and wide area networks, two way cable to the home networks, Internet access, and corporate enterprise networks. The cost and efficiency of the switch are key components in the overall cost of the system. Hence, an improvement in switch capacity would provide benefits in many applications.

Many modern electronic communications switches are capable of switching small elements of information, called cells, rapidly between an input port and an output port. A header at the beginning of each cell contains identifying information that may also be modified in the course of this switching. The switches typically accomplish this using connection control tables, stored in a specialized memory in the switch. One important measurement of the capacity of the switch is the number of connections that can be accommodated, i.e. the number of entries in the control tables and in the corresponding underlying switch hardware that uses the control tables.

In prior art, each connection supported by the switch occupies at least one entry in one or more of the connection control tables. Reducing the number of connection entries required in the switch would reduce the cost and complexity of the switch hardware. The present invention reduces the number of connection entries required in the switch, thus reducing the cost and complexity of the switch hardware.

In existing communications switches, at any one time, not all of the connections represented by the entries in the connection control tables are actively in use. This most frequently occurs when the cells contain data representative of computer data, rather than voice or video data. Such data typically comes in bursts interspersed with pauses that can be relatively long. During the pauses it is possible to temporarily remove the connection from the switch during these periods of inactivity thus freeing up the switch capacity for other connections.

Accomplishing this requires rapid control of the switch connection tables. The process of controlling these tables is referred to herein as connection caching. It is reminiscent of memory caching commonly used in the microprocessor industry.

Previous switches use control tables as disclosed in U.S. Pat. No. 5,479,401 by Bitz et al. Bitz et al. provides a table lookup mechanism using information found in the ATM cell header. However the entries in these tables are defined over the life of a connection. Bitz et al. does not modify these tables dynamically, based on current activity.

U.S. Pat. No. 5,067,123 by Hyodo, et. al. discloses a table circuit registering virtual channels presently formed in the ATM switching network in a management table, and a receiving part for receiving communication request from one of the terminals and for determining whether or not the management table registers a virtual channel corresponding to the communication request. It also contains a virtual channel setting part that registers the virtual channel in the management table. This is essentially a table look up mechanism with the added feature that an entry can be added dynamically when needed. However, Hyodo et al. deals with the control table that provides the actual switching information, and does not use a table lookup for a connection cache function, that is to determine if the management table within the switch presently has an entry corresponding to the incoming communication request.

U.S. Pat. No. 5,521,923 by Willmann et al. provides a method of temporarily storing data packets in two or more queues on the basis of data contained in the incoming packets. All of the queues share a common buffer memory, and cells not accommodated by the queues and memory are rejected. This is essentially a congestion control method to enable the switch to accommodate momentary overload conditions. However, Willmann et al. does not disclose a means for detecting idle connections due to aging and does not perform connection caching.

Pfeiffer et al. in U.S. Pat. No. 5,535,366 discloses a method of reclaiming unused resources in an ATM switch wherein the communications resource (e.g. the memory locations of the buffer) have an associated label marking the resource as being free or used, and have an associated time of entry stamp. All memory locations are checked at regular intervals for the age of their contents. Upon attainment of a predetermined age, the location is labeled as free. In Pfeiffer et al. the memory is normally marked free after use, however, error conditions can fail to mark the memory free, thus leaving it blocked for subsequent use. An object of the Pfeiffer invention is to discover these error conditions and correct them. Pfeiffer et al. does not use an aging algorithm to discover idle connections.

BRIEF SUMMARY OF THE INVENTION

Therefore, it is an object of the present invention to increase the connection capacity of a communications switch core without increasing the actual number of physical connections in the switch by dynamically reconfiguring the connections according to recent use of individual connections.

The present invention is a means of improving the capacity of a communications switch. It maintains a table of all connections assigned in the switch core of the communications switch. This table may contain more connections than the switch core can accommodate. The present invention further monitors each cell as it flows toward the switch, and determines if the switch core is currently configured to accommodate the cell. If the switch is configured, the cell flows through to the switch. If the switch is not configured to accommodate the cell, the cell is diverted to a cell holding area using a single first-in first-out (FIFO) memory, and a sequence is started to re-configure the switch to accommodate the cell. Once configured, the diverted cell is re-processed and hence flows through to the switch.

A reclaim ager detects activity associated with each configured connection. This provides indications of underused connections. An updater then uses these indications to select connections which can be temporarily removed from the switch core and replaced with connections corresponding to cells in the cell holding area These and other objects of the present invention will no doubt become obvious to those of ordinary skill in the art after having read the following detailed description of the preferred embodiments which are illustrated in the various figures.

BRIEF DESCRIPTION OF THE DRAWINGS

The present invention will be described in conjunction with the accompanying drawings, in which.

DETAILED DESCRIPTION OF THE INVENTION

The present invention extends the capacity of a communications switch. This switch may be an Asynchronous Transfer Mode (ATM) switch, a Frame Relay switch or any other switch that acts on units of user data usually called data cells, each of which has an identifying section such as a header, used for routing or identifying purposes. The data cells can represent actual data as from a computer, voice, video, or any other type of information. The preferred embodiment is described in terms of an ATM switch. However, the same technology can be applied to other types of switches as well.

Figure 1:
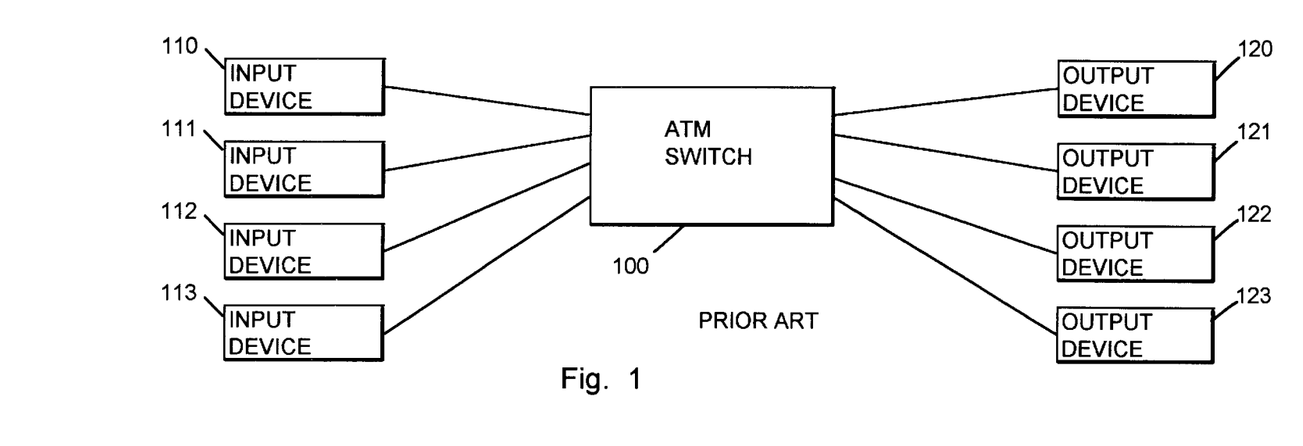
FIG. 1 is a block diagram of the prior art showing an ATM switch.

It is best to first describe in FIG. 1, the typical communications switch of the prior art. This is a description of a typical switch design and it should be recognized that this invention is applicable to a wide a variety of switch implementations. An ATM switch 100 receives cells from input devices 110 through 113 and delivers the cells to output devices 120 through 123. The ATM switch 100 uses information contained in the cell header together with the identification of which one of the input devices 110–113 on which the cell arrived to determine which one or several of the output devices 120–123 the cell should be sent. The ATM switch 100 may interface to any number of input devices 110–113 and output devices 120–123, and furthermore input devices 110–113 and output devices 120–123 may be implemented in pairs such that one of the input devices 110–113 and one of the output devices 120–123 constitute a single bi-directional device.

Figure 2:
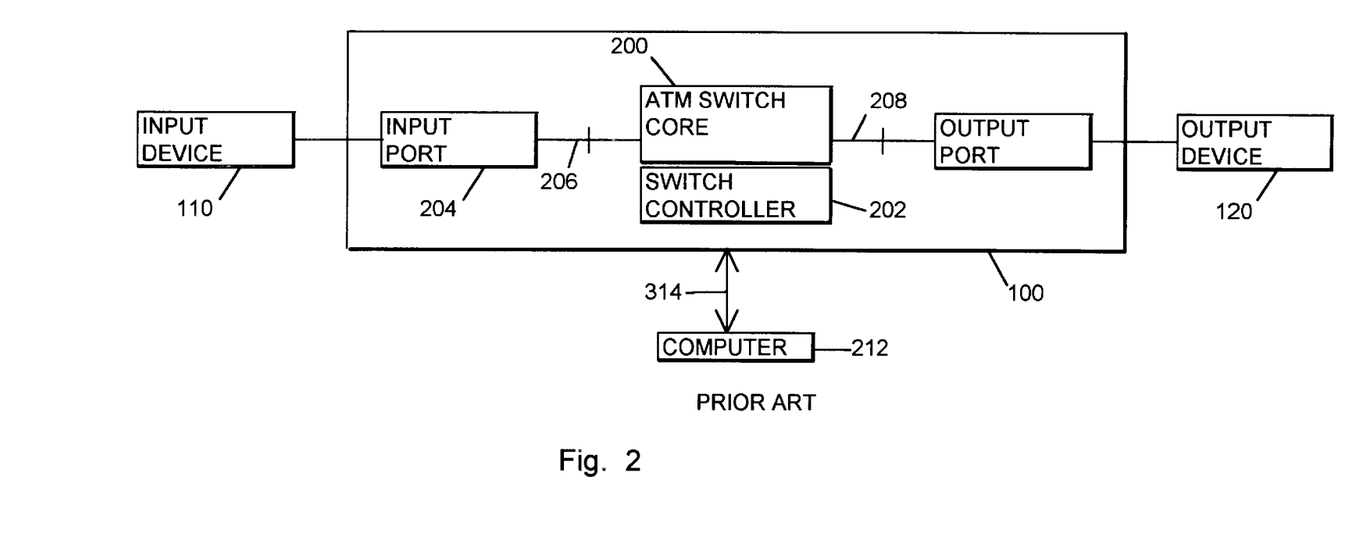
FIG. 2 is a block diagram of the prior art ATM switch of FIG. 1.

FIG. 2 further illustrates the ATM switch 100 of the prior art. The ATM switch 100 includes an ATM switch core 200, one or more input ports represented by an input port 204, one or more output ports represented by an output port 210, and a switch controller 202.

Each input port 204 interfaces and connects to one or more of the input devices 110–113 (FIG. 1) for passing fully formed ATM cells to the switch core 200 via a path 206. The path 206 also provides an indication to the switch core 200 for identifying the input port 204 that was the source of the cell.

The output port 210 accepts fully formed ATM cells via a path 208 and emits them to one or more of the output devices 120–123 (FIG. 1). Note that the switch core 200 may emit cells to a plurality of output ports represented by output port 210, and may send a plurality of copies of the cell to a single output port 210, each with a different header.

The switch core 200 includes a certain number of connection slots controlled by the switch controller 202 to be configured for connecting the input ports represented by input port 204 and the output ports represented by the output port 210, or to be idle. Typically, the switch controller 202 is implemented with one or more control memories. The control memories are written to by an external computer 212 to configure the connections, and read by the ATM switch core 200 in the process of actually routing the cells. The computer 212 controls the switch controller 202 via a control path 214 which may be a microprocessor bus or similar mechanism. The switch core 200 may additionally perform translations on the identifying header associated with the cell.

Figure 3:
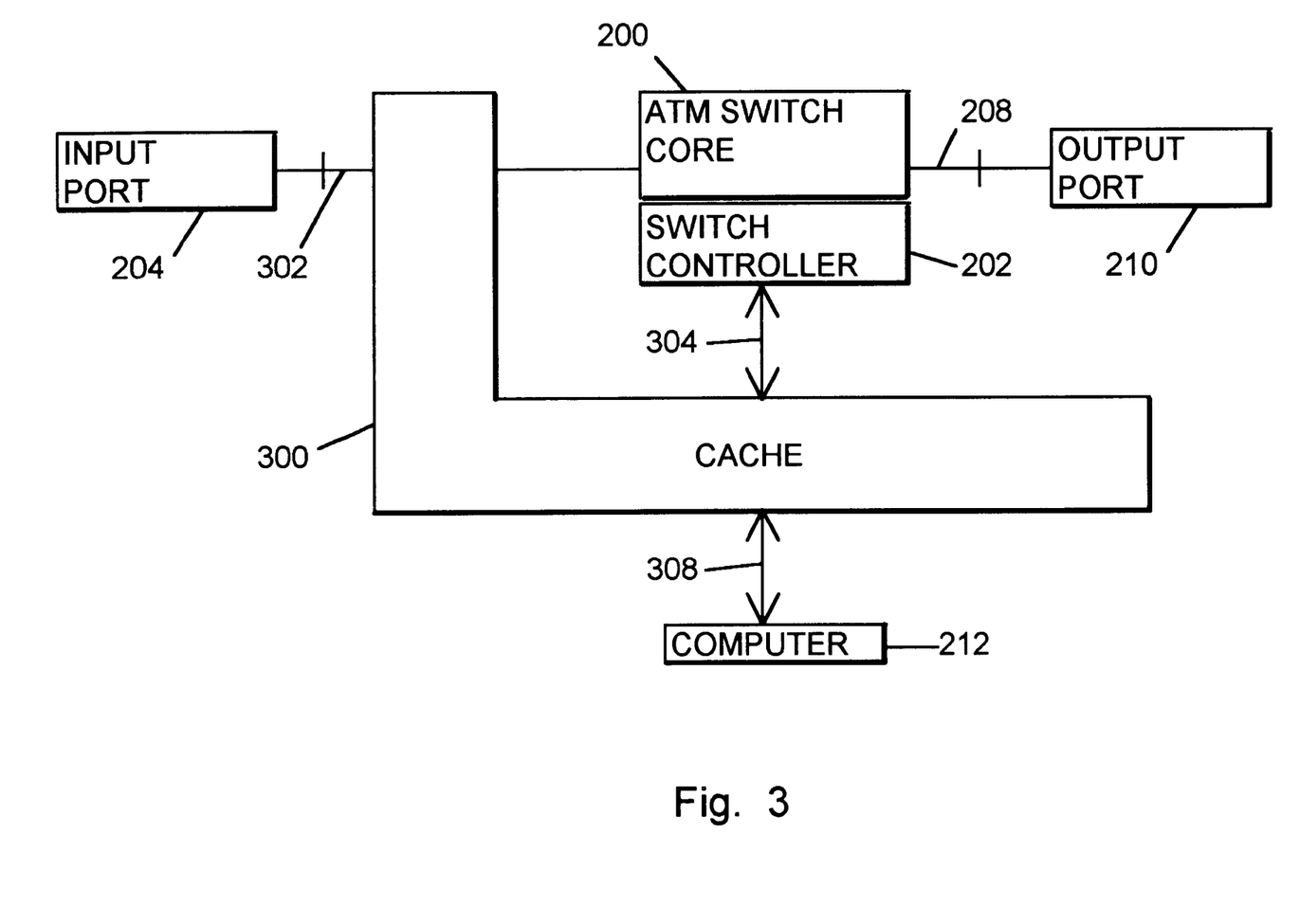
FIG. 3 is a block diagram showing the relationship of the ATM switch of FIG. 2 and the cache of the present invention.

FIG. 3 shows a cache 300 of the present invention integrated with the prior art ATM switch 100. The cache 300 may be implemented by combining its components with the elements of the ATM switch 100 in a variety of ways. The preferred embodiment presented here has minimal integration with these elements.

The computer 212 controls the cache 300 in a manner that is similar to the manner that the control computer 212 controls the ATM switch core 200 without the cache 300, as shown in FIG. 2. A control path 308 from the computer 212 to the cache 300 replaces the control path 214 of FIG. 2. The cache 300 controls the switch controller 202 via a path 304 in a similar manner to that shown in FIG. 2 with the path 214.

Input port 204 delivers cells to the cache 300 via a path 302 in a manner similar to the manner shown by the path 206 in FIG. 2 that delivers cells to the switch core 200. The cells from the cache 300 are delivered to the switch core 200 via a path 310 in a similar manner to that shown in FIG. 2 with the path 206. The switch core 200 emits cells via path 208 as in FIG. 3.

The cache 300 may be implemented using a combination of commonly available hardware and software as appropriate for the switch technology. This may include, but is not limited to, such semiconductor components as Field Programmable Gate Arrays (FPGAs), Application Specific Integrated Circuits (ASICs), Content Addressable Memories (CAMs), First-In-First-Out devices (FIFOs), Digital Signal Processors or RISC processors and software. These components are familiar to those skilled in the art of ATM switching.

Figure 4:
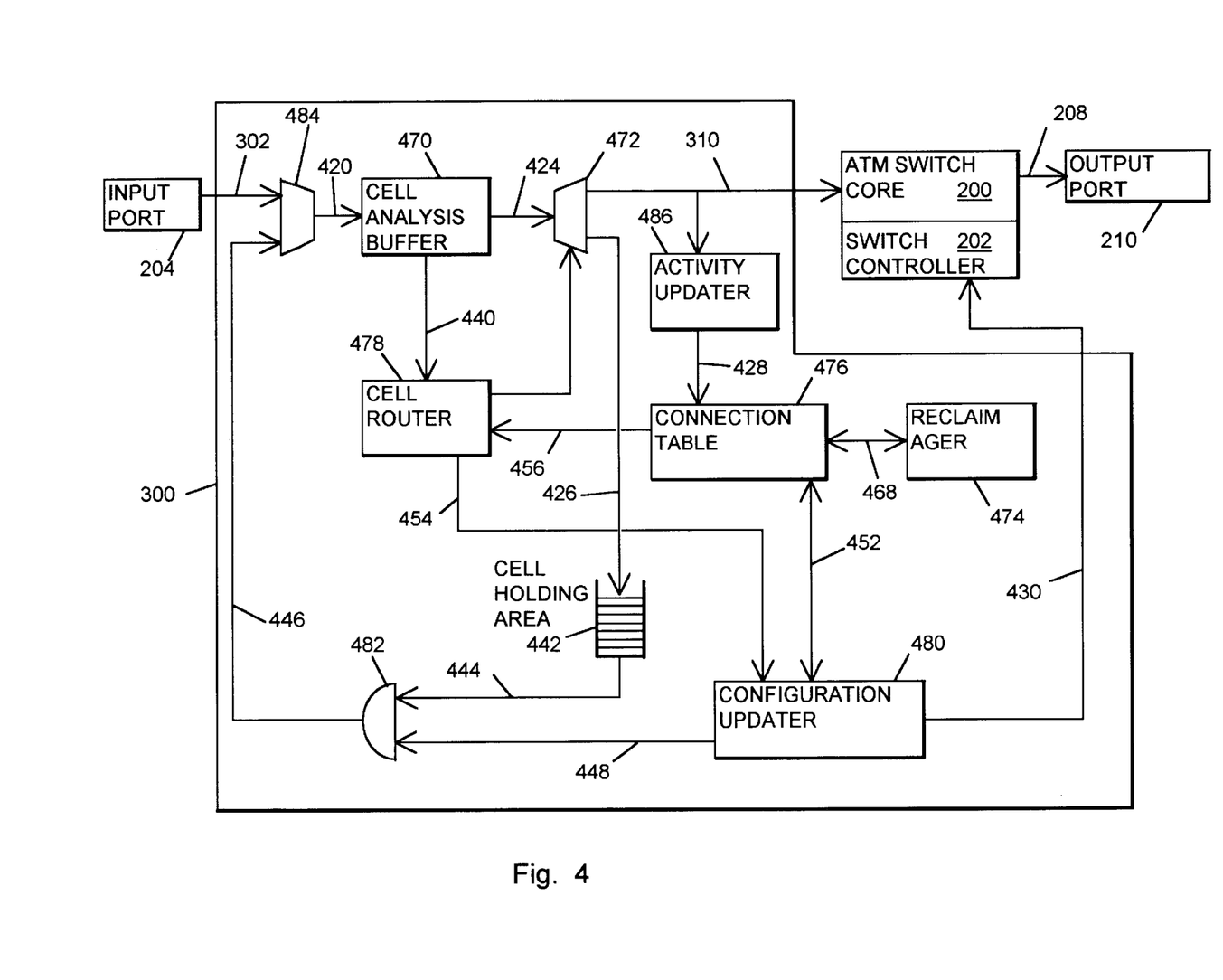
FIG. 4 is a block diagram of the cache of FIG. 3.

FIG. 4 is a block diagram of the cache 300. The cache 300 includes the path 302, a path 446, a multiplexer 484, a path 420, and a cell analysis buffer 470 for receiving an incoming data cell. In the preferred embodiment, the path 302 is part of a UTOPIA (Universal Test and Operations Physical Interface for ATM). When the cell analysis buffer 470 indicates that it is empty, the cell and its associated input port identification information are routed from the input port 204 via the path 302, through the multiplexer 484 to the path 420, and into the cell analysis buffer 470. Note some implementations will route the whole cell while others may route just the header, or portions of the header, and handle the rest of the cell by an alternate means. The multiplexer 484 will select a cell from either the path 302 or from the path 446. The path 446 has priority over the path 302 from the input port 204.

The cell analysis buffer 470 accommodates one cell at a time and is capable of supplying selected portions of the cell header and the input port identification information to a cell router 478 via a path 440 and of sending the cell to a multiplexer 472 via a path 424. An buffer empty indication is also supplied by the cell analysis buffer 470 to the multiplexer 484. When a cell is placed into the cell analysis buffer 470, via the path 420, the relevant portions of the header and the input port identification information are supplied to the cell router 478 via path 440.

Figure 5:
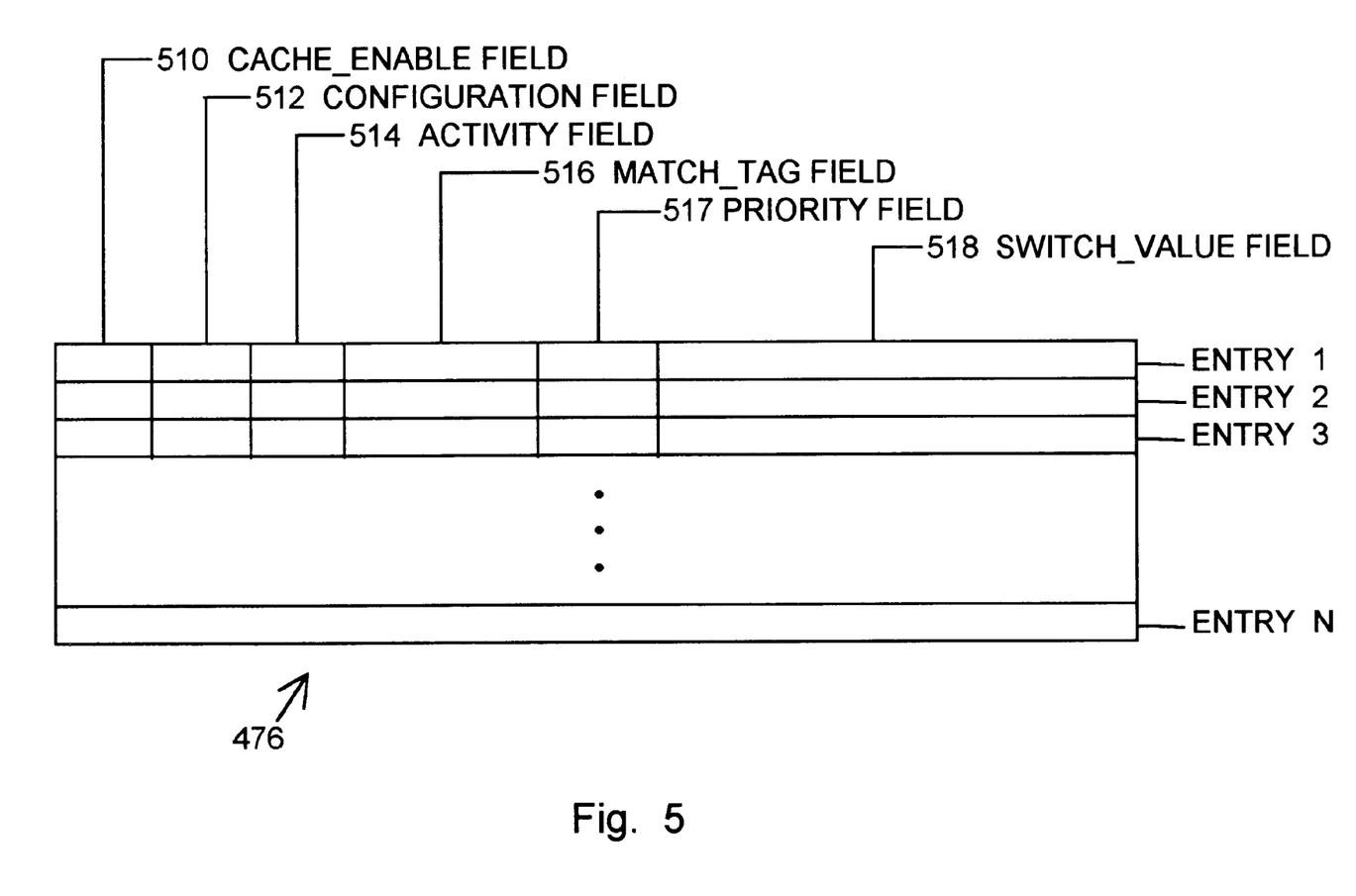
FIG. 5 is a chart of a connection table of the cache of FIG. 4.

The cell router 478 uses the header and input port identification information to determine a specific entry in a connection table 476 representative of the connection associated with the cell. The cell router 478 receives status information for the connection from the specific entry of the connection table 476 via a path 456 to determine the status of the connection associated with the cell and control the multiplexer 472 via a path 430 accordingly. This look-up function may use any number of well known alternatives including a Content Addressable Memory (CAM) lookup or cache mechanisms as commonly employed in microprocessor designs. The connection table 476 entry includes information indicating whether the associated connection is presently set up in the switch controller 202, information necessary to set up the connection, and an activity field 514 (FIG. 5). If the connection is presently set up in the switch controller 202, information necessary to identify the connection is also provided along with the status information. The status and other information contained in the connection table 476 is illustrated in FIG. 5 and the accompanying detailed description.

If the status information indicates that the associated connection is set up in the switch controller 202, the cell router 478 directs the multiplexer 472 to move the cell from the cell analysis buffer 470 to the switch core 200 via the path 310. In the process, the activity field 514 (FIG. 5) in the connection table 476 is updated by an activity updater 486 via a path 428 to show that the connection has carried a cell. Once in the switch core 200, the cell is routed to one or more of output ports represented by output port 210 via the path 208.

If the status information indicates that the associated connection is not set up in the switch controller 202, the cell router 478 directs the multiplexer 472 to route the cell from the cell analysis buffer 470 to a cell holding area 442 via a path 426. The holding area 442 is a memory which is capable of holding multiple cells, and functions as a conventional first in first out (FIFO) memory. At the same time that the cell is directed to the holding area 442, information associated with the cell and the connection in the switch core 200 that is required for the cell is supplied to a configuration updater 480 from the cell router 478 via a path 454.

The configuration updater 480 then does the following steps:
1. determines when a connection in the switch core 200 is currently idle or underused based on information derived from the connection table 476;
2. when the connection associated with the cell is not currently configured, directs the switch controller 202 via a path 430 to re-configure the switch core 200 in order to configure the connection and, if necessary, to unconfigure the idle or underused connection determined above;
3. updates the connection table 476 via a path 452 to indicate which connections are now configured or not configured; and
4. enables a gate 482 via a path 448 for enabling a cell to be passed from the holding area 442 via a path 444 to the multiplexer 484 via the path 446.

When the gate 482 is enabled, and the cell analysis buffer 470 becomes idle, the multiplexer 484 passes the cell to the cell analysis buffer 470. This second time, the connection will be present in the switch controller 202, hence the cell will flow through the cell analysis buffer 470, the path 424, the multiplexer 472, and the path 310 to the switch core 200. Once the gate 482 is enabled, all of the cells present in the holding area 442 are allowed to flow through the gate 482, then the gate 482 is disabled. This process is referred to as re-circulating the cells.

A reclaim ager 474 is connected to the connection table 476 via a path 468 for periodically evaluating the activity of the connection to determine which connections configured in the switch controller 202 are least likely to be used in the near future. As the data cells flow through they are each re-processed by the cell analysis buffer 470 as described above. This function is reminiscent of cache designs found in microprocessors. Connections in the connection table 476 that are seldom or never used are marked by the reclaim ager 474 as underused. The configuration updater 480 then selects a connection marked as underused when locating an available connection in the switch controller 202.

Alternatively, the reclaim ager 474 may use other criteria, instead or in conjunction with connection activity when deciding that a connection be marked as underused. Such alternative criteria may include, but is not limited to, random selection from the entries O-N, sequential selection of the entries O-N, and/or selection based on a priority assigned by the external computer 212 to the connection. The priority may be represented in several ways including quality of service (QOS) classes. Such QOS classes are described by the "ATM Forum User-Network Interface Specification", version 3.0, Appendix A, available from the ATM Forum Offices, World Headquarters, Mountain View, Calif.

To further explain this aging and activation detection function, refer to a representative configuration of the connection table 476 shown in FIG. 5. The connection table 476 consists of one entry per each connection, represented by entry 0, entry 1, entry , and so on to entry N. The connection table 476 may be indexed in a number of ways common in the industry, including multi-stage lookup, content accessable memory (CAM), or direct indexing, all based on information derived from the cell identifying header and, optionally, the input port identification information.

Each entry 0-N of the connection table 476 consists of binary bits representative of several information fields. The exact fields vary with the details of the switch core 200 and switch controller 202. Furthermore, specific implementations may utilize a variety of memory geometry's and access methods, as are well know in the industry. Unless otherwise noted, these fields are initialized by the computer 212. The specific information fields are as follows.

1. A configuration field 512 for indicating that an associated connection represented by the corresponding entry 0-N in the table is currently set up (configured) in the switch controller 202, and that the switch core 200 will properly switch a cell with an appropriate header. The cell router 472 uses a derivative of this information field, in concert with other information, described below, to decide if a cell in the cell analysis buffer 470 should be sent to the switch core 200 or to the cell holding area 442.

2. The activity field 514 for indicating the recent usage of the associated connection. The activity field 514 may be modified by the activity updater 486 each time a cell related to the connection represented by the corresponding entry 0-N is passed by the cell router 472 to the switch core 200. The reclaim ager 474 uses the activity field 514 for indicating that the associated connection is underused. The preferred embodiment uses a single binary bit for this function. However, it should be noted that other designs may use more complex mechanisms, including but not limited to counters or shift registers.

3. An optional cache_enable field 510 for holding a logical data value which, if set, indicates the connection represented by the corresponding entry 0-N is eligible for processing by the present invention. If not set in the preferred embodiment, the cell is always passed through to the switch core 200, and the switch core tables 202 associated with this connection are not modified or affected by the present invention. Typically, the computer 212 will set this bit depending upon, but not limited to, the quality of service (QOS) required by the type of connection.

4. An optional match_tag field 516 for holding a data element which, if present, is utilized by the cell router 478 to determine if the entry 0-N is related to the cell in the cell analysis buffer 470. The format of this data may vary considerably in different implementations. Implementations which can directly resolve header and input port information to the entry 0-N in the connection table 476 do not require this field. In the preferred embodiment, selected bits from the cell header are concatenated by cell analysis buffer 470 in order to compose a value that can be compared against this match_tag field 516.

5. An optional switch_value field 518 for holding the information needed by the switch controller 212 to facilitate switching of the associated connection by the switch core 200. The value held in switch_value field 518 depends upon the detailed design of the switch core 200 and the switch controller 202. It typically contains information from several tables or other mechanisms the switch core 200. While not part of the preferred embodiment, it should also be noted that this information element may be shared with a memory in the switch core 200 in such a way that only one copy of this information need exist. This may be done via various memory management techniques such as virtual memory management, common in many microprocessors, such as the Sun SPARC family of microprocessors, information for which is vailable from SUN Microsystems of Mountain View, Calif.

6. An optional priority field 517 for indicating a priority level for the connection associated with the entry O-N for use by the reclaim ager 474 for determining which of the entries are to be labeled as underused. The priority field 517 may include information such as the QOS associated with the connection.

Optionally, the connection table 476 may be augmented with additional information for improved efficiency or convenience of implementation. For example, information related to traffic policing may be kept. This information is used to keep a sender from switching more than an authorized number of cells.

Returning now to the reclaim ager 474 operation, depicted in FIG. 4, a number of algorithms may be employed for detecting when a connection is underused. In the preferred embodiment the reclaim ager 474 remains idle until the activity updater 486 discovers that all, or nearly all, the entries 0-N in the connection table 476 are marked as configured. The configuration updater 480 then activates the reclaim ager 474 which examines each entry O-N in the connection table 476 until it finds one of the entries 0-N that shows little or no activity. The entry 0-N that is underused is identified as having bits in the cache_enable field 510, the configuration field 512, and the activity field 514 asserted, that is set to a value of one. The reclaim ager 474 then marks the entry 0-N that is underused as inactive by de-asserting, or setting to zero, a bit in the activity field 514. Of course, zero and one may be reversed for represented the asserted or unasserted state. At some time later, the configuration updater 480 may use the activity field 514 for locating an available connection. Because the activity field 514 has been de-asserted, the configuration updater 480 may select the associated entry O-N for reuse. However, if in the mean time, another cell comes through the connection, the activity field 514 will again be asserted as described above and the configuration updater 480 will not select this associated connection for re-configuration. In the preferred embodiment, the reclaim ager 474 also selects a limited number of additional reclaimable entries in the connection table 476 and likewise marks them available for re-use, in anticipation of impending need. It then becomes idle once again.

Alternatively, the single bit in the activity field 514 is replaced by a saturating multi-bit counter. Starting at a minimum, each time a cell passes through the connection associated with the entry O-N, the counter is incremented, until it reaches an upper limit where upon it no longer increments. In this embodiment, the reclaim ager 474 continuously examines each entry O-N sequentially looking for the associated counters that have reached their upper limit, and resets those counters their minimum value. Statistically, a low usage for a particular one of the entries 0-N is indicated by a low count number. The configuration updater 480 selects one or more of the entries 25 0-N whose count is at or below a selected lower limit for re-configuration of the associated connection in the switch 100. The lower limit may be equal to the minimum value.

Figure 6:
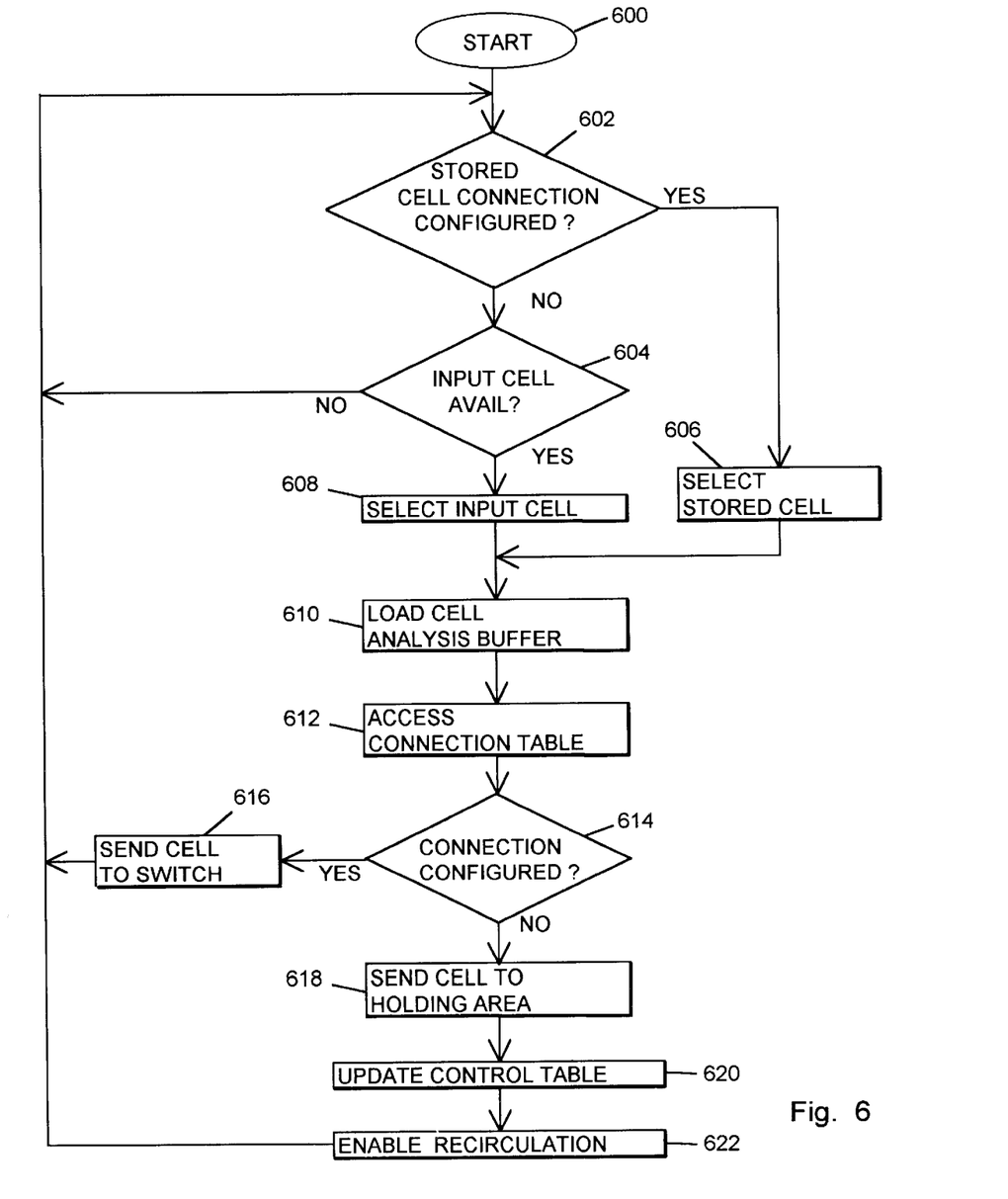
FIG. 6 is a flow chart depicting the operation of the cache of FIG. 4.

Referring to FIG. 6, a flow chart of a preferred method using the cache 300 for effectively increasing the connection capacity of the switch 100 is shown with respect to the elements illustrated in FIG. 4. At the start 600 the cell analysis buffer 470 is empty and the cell holding area 442 stores at least one cell. At a step 602 the configuration updater 480 determines if the connection associated with the cell stored in the cell holding area 442 is configured in the switch core 200. At a step 606 if the connection is configured, the configuration updater 480 enables the gate 482 to pass the cell to the multiplexer 484. The multiplexer 484 selects the path 446 and passes the cell through the path 420 to the cell analysis buffer 470. Otherwise, at a step 604 the multiplexer 484 determines if an incoming cell is available from the input port 204. If no cell is available, the flow returns to the step 602. At a step 608 if a cell is available from the input port 204, the multiplexer 484 selects the path 302. Then, at a step 610 when a cell is selected from either path 302 or 446, it is loaded into the cell analysis buffer 470. At a step 612, the cell router 478 accesses the connection table 476. At a step 614 the cell router 478 determines whether or not the connection associated with the cell is configured. At a step 616 if the connection is currently configured, the cell router 478 sends the cell to the switch core 200, the activity updater 486 updates the activity field 514 in the connection table 476, and the flow returns to the step 602. At a step 618 if the connection is not currently configured, the cell router 478 sends the cell to the cell holding area 442 to be stored. At a step 620 the configuration updater 480 selects the corresponding entry 0-N in the switch controller 202, updates the entry 0-N to correctly process the cell, and updates the connection table 476 with current information. Then, at a step 622 the gate 482 is enabled to provide an indication that a cell is available, whereupon the cell is re-circulated.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A cache apparatus for receiving data cells, issuing said cells to a communications switch having configurable connections between input ports and output ports, and providing reconfiguration information to said switch for reconfiguring said connections, comprising:
   an activity updater for issuing an activity update whenever each of said cells issues to said switch for using a first of said connections;
   a reclaim ager for using said activity update for determining when said first connection is underused and providing an underused indication associated with said first connection when said first connection is determined to be underused, said underused indication for use in generating said reconfiguration information; and
   a configuration updater coupled to the reclaim ager for receiving said underused indication and issuing said reconfiguration information to said switch for unconfiguring said first connection.

2. The apparatus of claim 1, further including:
   a connection table coupled to the activity updater for receiving said activity update, to the reclaim ager for providing information for said activity update and receiving said underused indication, and to the configuration updater for providing said underused indication.

3. The apparatus of claim 2, wherein:
   the connection table includes a bit that is set by said activity update and reset by said underused indication.

4. The apparatus of claim 2, wherein:
   the connection table is further for receiving priority information for indicating a priority for said first connection; and
   the reclaim ager is for issuing said underused indication based at least in part upon said priority information.

5. The apparatus of claim 2, wherein:
   the connection table includes a counter having a resettable count number having an upper limit;
   the activity updater is coupled to said counter for incrementing said count number by said activity update; and
   the reclaim ager is coupled to said counter for providing said underused indication by resetting said count number when said count number reaches said upper limit.

6. The apparatus of claim 2, wherein:
   the connection table is further for receiving control information from an external computer and for providing said control information to the configuration updater for controlling said switch.

7. The apparatus of claim 1, further including:
   a cell holding area for storing at least one of said cells; and
   a cell router for receiving connection information associating a first of said cells with said first connection, receiving configuration information indicating when said first connection is configured in said switch; and routing said first cell to said switch when said first connection is configured or routing said first cell to the cell holding area when said first connection is not configured.

8. The apparatus of claim 1, further including:
   said communications switch for passing at least one of said cells through at least one of said configurable connections.

9. A cache apparatus for receiving data cells, issuing said cells to a communications switch having configurable connections for switching said cells, and providing reconfiguration information to said switch for reconfiguring said connections, comprising:
   a cell holding area for holding said cells when said cells are stored;
   a cell router for receiving connection information associating said cells with said connections, respectively, for receiving configuration information indicating when said respective connections are configured, and for routing an incoming first of said cells to said switch when an associated first of said connections is configured or routing said incoming first cell for storage in the cell holding area when said first connection is not configured;
   a multiplexer having a first input coupled to the cell holding area for receiving said stored first cell when said first connection becomes configured and a second input coupled for receiving said incoming first cell and then an incoming second of said cells; and
   a configuration updater for controlling the multiplexer for passing said stored first cell for re-routing by the cell router when said first connection becomes configured before passing said incoming second cell for routing by the cell router.

10. The apparatus of claim 9, further including:
    a configuration updater coupled to the cell holding area for receiving said connection information and coupled to said switch for receiving said configuration information and issuing said reconfiguration information for configuring said first connection when said first connection is not configured.

11. The apparatus of claim 9, wherein:
    the cell router is further for routing said incoming second cell to said switch when an associated second of said connections is configured or routing said incoming second cell for storage in the cell holding area when said second connection is not configured; and
    the cell holding area is a first cell in first cell out (FIFO) memory for storing said first cell and said second cell when said first and said second connections, respectively, are not configured and for issuing said first stored cell to the multiplexer before issuing said second stored cell when either said first or said second connection becomes configured.

12. The apparatus of claim 9, further including:
    said communications switch for passing at least one of said cells from an input to at least one output through at least one of said configurable connections.

13. A caching method for improving a connection capacity of a communications switch having configurable connections for switching data cells, comprising steps of:
    receiving an activity update associated with a certain one of said connections whenever each of said cells passes through said certain connection;
    determining from said activity update when said certain connection is underused;
    receiving priority information in a connection table entry for indicating a priority for said certain connection; and
    issuing reconfiguration information to said switch for unconfiguring said certain connection when said certain connection is determined to be underused and based upon said priority information.

14. The method of claim 13, further including steps of:

increasing a count number associated with said certain connection when said activity update is received;

resetting said count number when said count number reaches an upper limit; and determining said certain connection is underused by determining that said counter number is less than a selected lower limit.

15. A caching method for improving a connection capacity of a communications switch having configurable connections for switching data cells, comprising steps of:

receiving an incoming first of said cells having connection information associating said first cell with a first of said connections;

determining whether or not said first connection is configured in said switch;

storing said first cell when said first connection is not configured;

receiving an incoming second of said cells having connection information associating said second cell with a second of said connections;

determining whether or not said first connection has become configured; and routing said stored first cell to said switch when said first connection has become configured before determining whether or not said second connection is configured.

16. The method of claim 15, further including steps of:

determining whether or not said second connection is configured;

storing said second cell when said second connection is not configured; and routing said first stored cell to said switch always before routing said second stored cell when either said first or said second connection becomes configured.

* * * * *